United States Patent [19]
Janky

[11] Patent Number: 5,815,866
[45] Date of Patent: Oct. 6, 1998

[54] MULTI-FUNCTION TOOL SET

[76] Inventor: Greg Janky, 7023 40th Ave. NE., Seattle, Wash. 98115

[21] Appl. No.: 812,456

[22] Filed: Mar. 6, 1997

[51] Int. Cl.[6] ........................................................ A01B 1/00
[52] U.S. Cl. ........................................ 7/114; 7/158; 30/149
[58] Field of Search ................................ 7/114, 116, 158; 30/123, 149, 194; 81/415, 417

[56] References Cited

U.S. PATENT DOCUMENTS

| | | | |
|---|---|---|---|
| 671,231 | 4/1901 | Poindexter | 7/114 |
| 4,097,945 | 7/1978 | Scott | 7/116 |
| 4,521,964 | 6/1985 | Maruyama | 30/149 X |

*Primary Examiner*—James G. Smith
*Attorney, Agent, or Firm*—William E. Pelton

[57] ABSTRACT

A tool set of the pivoted crossed lever type is provided with a pair of members pivotally and releasably connected to one another. The members may be biased, in effect, to an open essentially crossed position. Such a bias may be provided by magnetic poles of opposed polarity placed in juxtaposed surfaces formed on each of the members. The polarity of the magnetic poles may be switchable to enable the juxtaposed surfaces to be selectively attracted or repelled from each other.

10 Claims, 5 Drawing Sheets

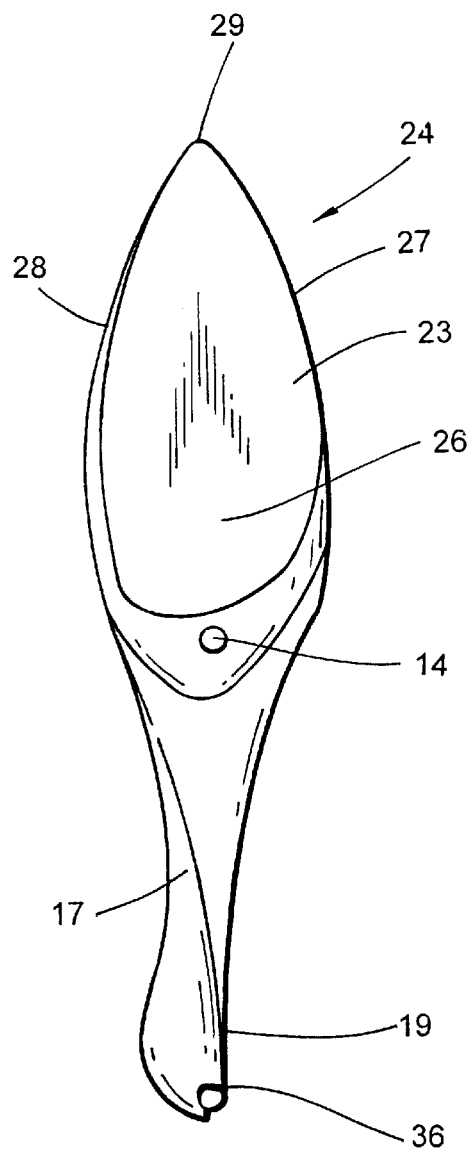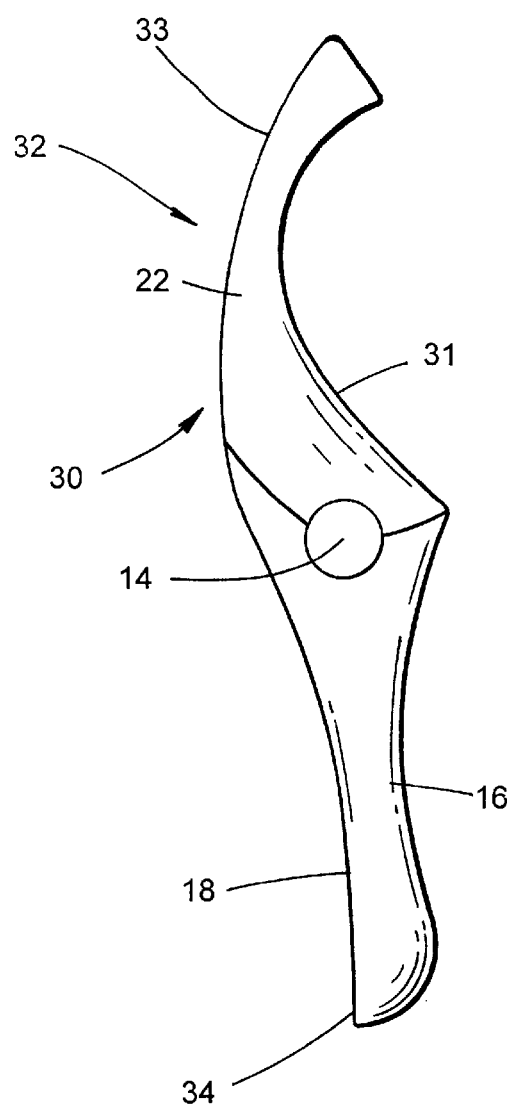
FIG. 4
FIG. 5

5,815,866

MULTI-FUNCTION TOOL SET

FIELD OF THE INVENTION

This invention relates to hand tools, and in particular to a multi-purpose yard or gardening tool set consisting of a composite or compound tool of the crossed lever type formed from a plurality of detachable tool elements which function together or which may be detached for use separately or distinctly from each other, as desired.

BACKGROUND OF THE INVENTION

Heretofore multi-purpose hand tools have been multifaceted in the sense that a single tool has been designed to perform a plurality of functions. Alternatively, the prior types of multi-purpose hand tools have consisted of discrete tool elements affixed in such a way as to permit the use of one without interference from the other, as desired. These devices have been bulky and difficult to manuever, to operate, to transport and to store.

In contrast, a multi-purpose tool in accordance with the present invention consists of a set of tools adapted pivotally to nest together as crossed lever members. The individual lever members or tools are detachable, one from the other, for separate use. In the nested position, the tool set functions effectively as a pruning shear and is convenient for storage and transportation.

When the individual tools are separated, each may be used for a different purpose. In the preferred embodiment, one tool member is provided with a scoop or spade section so as to enable it to function as a shovel. The other tool member is formed with a tang or prong portion to enable it to be used as a soil cultivator.

SUMMARY OF THE INVENTION

A multi-function tool set according to the present invention consists of a split body formed of first and second members pivotally and releasably connected to one another to form a crossed lever type composite tool. Each of the members has respectively opposed first and second mating surfaces adjacent the pivot axis therebetween. The mating surfaces are each preferably substantially flat, at least across portions defining the area of confrontation. Each of the mating surfaces may comprise or otherwise be provided with magnetic material in which a matrix of magnetic poles having alternating polarities may be induced. The matrices of magnetic poles are selectively positioned so that the first and second surfaces may attract or repel each other. The polarities of the magnetic poles of at least one matrix relative to the magnetic poles of the other matrix may be switchable to enable alternate attraction or repulsion, as desired.

In the preferred embodiment, the pivot axis of the first and second members is substantially at the mid point of each of the members. On one side of the pivot axis cooperating lever portions of each of the crossed members comprise respectively first and second handle grips which may define the mating surfaces. The mating surfaces permit a closed together mating condition in which the grips together define a single manipulating handle for the composite tool to be grasped in one hand by the user.

On the other side of the pivot axis the first and second members comprise overlapping and engaging tool elements, one of which consists of an implement having the shallow-dished and pointed configuration of a scoop or shovel. In this embodiment, one edge of the shovel implement is blade-like and is sharpened into a cutting edge, or is formed of sharpenable material.

Immediately above and adjacent the dished or shovel implement, the other tool member consists of a scarifying implement one edge of which comprises a cutting blade that engages and is slidable past the sharpened edge of the shovel in the nesting position of the tool set. In the preferred embodiment, the scarifying implement and its blade have a curved, even hook-like configuration in the plane of the blade. This configuration defines a preferably single smoothly curved tang or prong element for use in scarifying or cultivating the soil. Together, the composite crossed lever shovel and cultivator implements define a pruning shear.

In one use of the composite tool set of this invention, each matrix of magnetic poles in the mating surfaces consists of poles having alternating polarities. The matrices are positioned so that as the handles of the crossed members of the tool set are brought together toward their mating condition, the magnetic poles repel tending to cause the handles to move apart. The force of repulsion is inversely proportional to the distance between the handles. Without pressure to close the handles against the repulsive force, therefore, the handles of the tool set will experience a magnetic bias tending to push them apart into the open or cutting position of a pruning shear.

In another use of the tool set, the magnetic forces induced in or resulting from the magnetic materials are adjusted so that the polarities are opposite and therefore attractive. With this adjustment, the crossed members of the tool set are magnetically biased into and will be magnetically held in their mating or closed position. This facilitates certain uses of the tool set as well as its storage or transportation.

The tool set has a detached condition in which the crossed members are separated from each other to permit their manipulating handles to be separately grasped by the user for independent uses, as desired.

BRIEF DESCRIPTION OF THE DRAWINGS

For a further understanding of the present invention, reference may be made to the accompanying drawings, in which:

FIG. 4 is a top plan view of the shovel tool member of the tool set of the present invention;

FIG. 5 is a top plan view of the cultivator tool member of the tool set of the present invention;

BRIEF DESCRIPTION OF THE PREFERRED EMBODIMENTS

Figure 1:
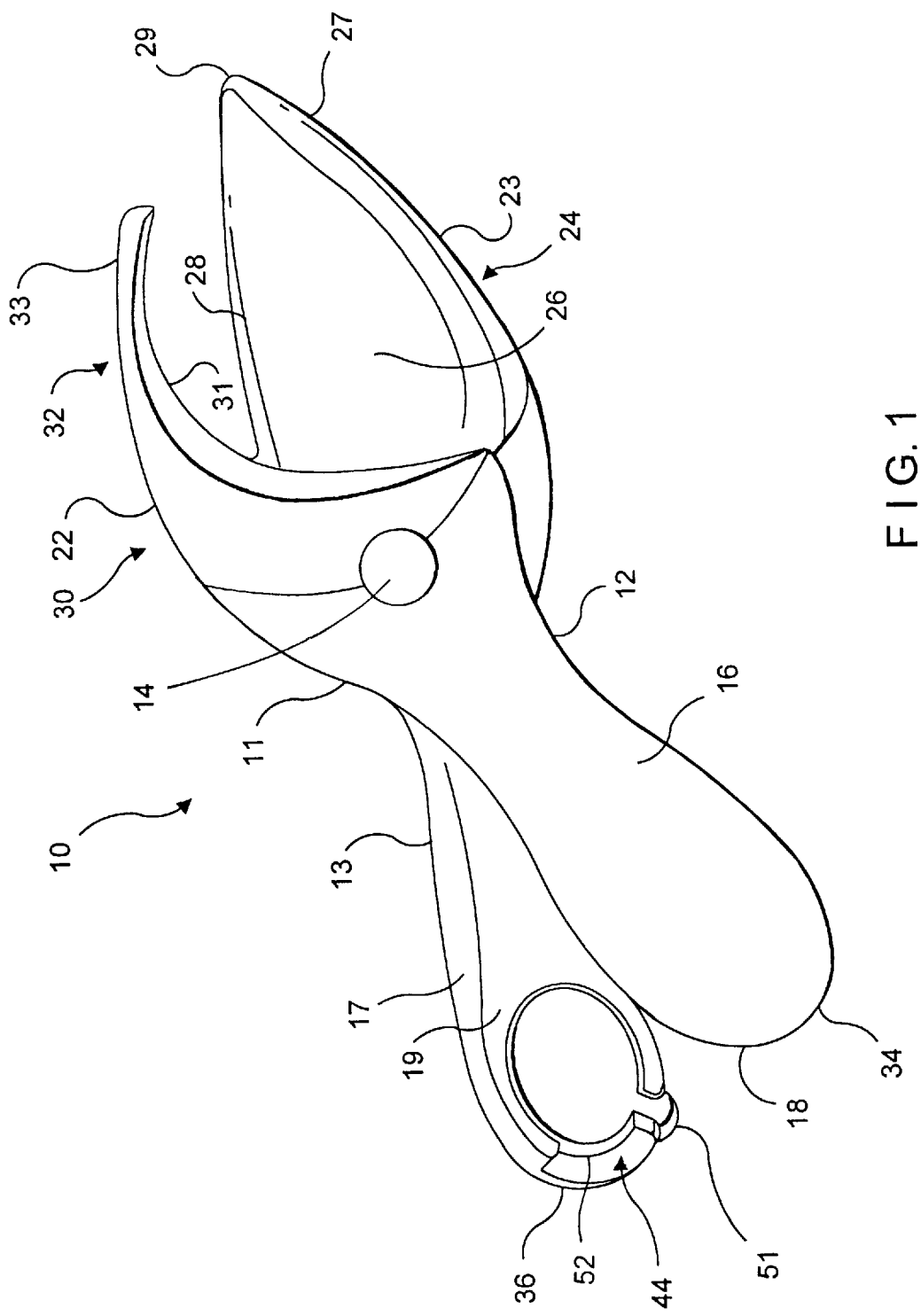
FIG. 1 is an elevated perspective view of the split body multi-purpose tool set of the present invention, showing the assembled device in the open position of a pruning shear.
Figures 2, 3:
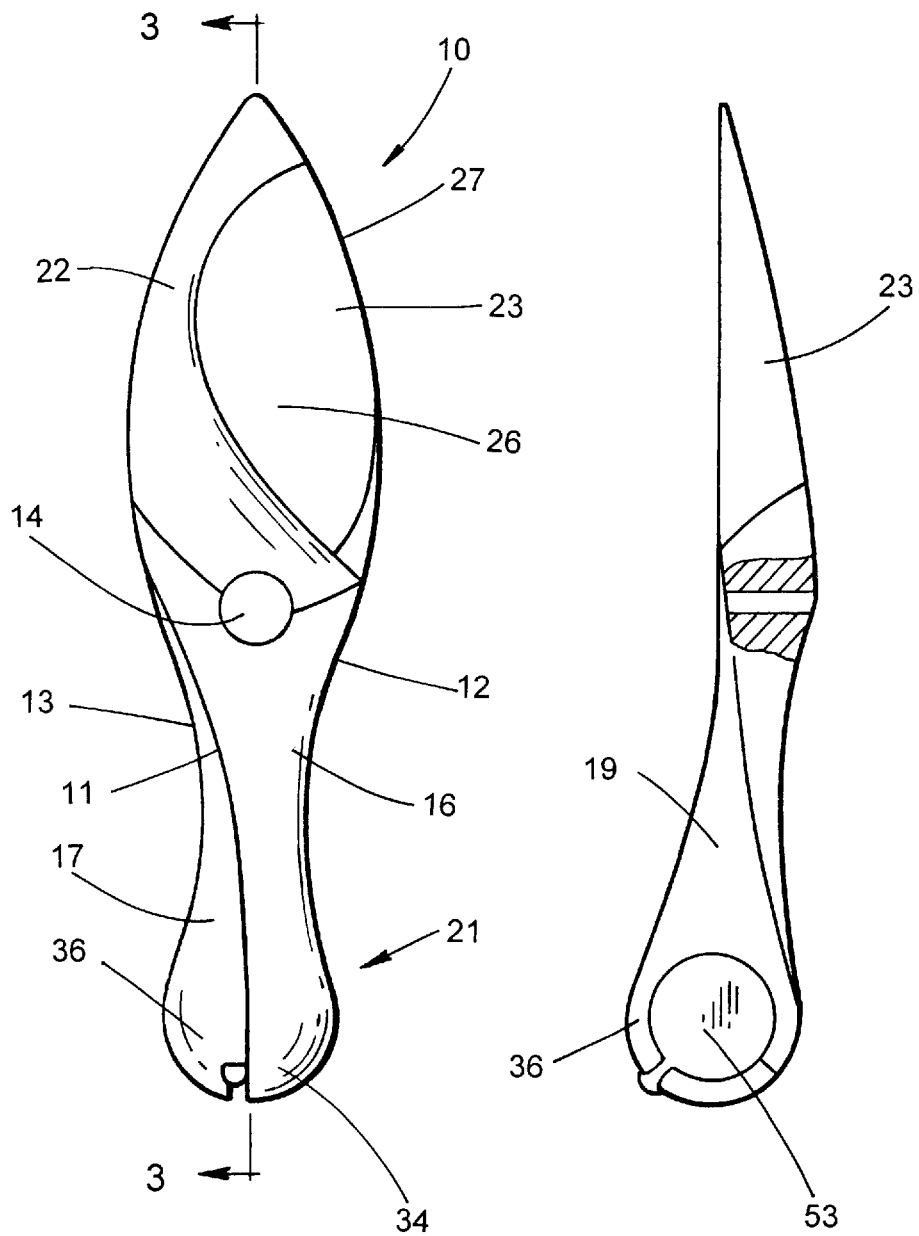
FIG. 2 is a top plan view of the device shown in FIG. 1, in the closed position of a pruning shear.
FIG. 3 is a cross sectional view taken along the line 3—3 of FIG. 2.

Referring now to the drawings, and in particular to FIGS. 1 and 2, there is shown a composite multi-purpose tool set 10 which, in accordance with the embodiment illustrated, consists of a split body 11 formed from first and second tool members 12 and 13 respectively. The tool members 12 and 13 are pivotally and detachably interconnected on a pivot axis 14 substantially at the mid point of each of the members and thereby form a crossed lever type of composite tool set.

Cooperating portions to one side of the pivot axis 14 of each of the tool members 12 and 13 may be formed into respective first and second handle grips 16 and 17, respectively. The grips 16 and 17 may be formed beginning substantially adjacent the pivot axis 14, and are preferably ergonomically configured for comfort and control.

Each of the grips 16 and 17 defines one of a pair of opposed or confronting first and second substantially flat mating surfaces 18 and 19, respectively. The surfaces 18 and 19 permit a closed together mating condition, substantially as shown in FIG. 2, in which the grips 16 and 17 together define a single manipulating handle 21 to be grasped in one hand by the user.

To the other side of the pivot axis 14, the first and second tool members 12 and 13 are configured as overlapping, slidably engaging tool implements 22 and 23, respectively. As shown in FIGS. 1, 2 and 4, one of the tool implements, for example the lower tool implement 23 of the tool set depicted, preferably consists of a shallow concave dish portion 26 having curved edge surfaces 27 and 28 that converge at a pointed end 29. This configuration defines a scoop or shovel-type implement. At least one of the edge surfaces, e.g. edge surface 28 of the shovel-type implement 24, is blade-like and may be sharpened, as described further below.

As shown in FIGS. 1 and 5, immediately above and adjacent the shovel-type implement 24 an upper tool implement 30 of the present tool set includes a cutting blade having a sharpened edge 31. In the assembled or nested position of the tool set, the sharpened edges 28 and 31 of the shovel-type implement 24 and upper tool implement 30, respectively, are adapted to engage and slide past each other in a scissors-like action. The assembled tool set thereby has the ability to function as a pruning shear.

In the preferred embodiment, a portion 32 of the upper tool implement 30 has a smoothly curved or hook-like configuration in the plane of the blade. The configuration of the upper tool implement 30 generally defines a preferably single tang or prong 33 which may be separately used as a cultivator implement to scarify the soil. The tang 33 displays a gradual diminution of thickness and width over its length and generally curves in a direction following the curving peripheral edge 28 of the shovel-type implement 24. The sharpened edge 31 of the tang 33 may have a smaller radius of curvature than does the edge 28, as desired.

The upper tang and lower shovel-type implements of the present tool set may be made from any suitably hardened material, although stainless steel is preferred. For extra durability, it is also preferable that the tool implements 12 and 13 be constructed entirely of the same material which is extended to form the core of the handle grips 16 and 17. This construction eliminates a weak spot found substantially at the point where the grip and blade sections intersect in conventional garden tools.

In the present embodiment, the grips themselves may be made of another suitable material and formed or placed around the steel core. One particularly effective material for the grips is recycled high density polyethylene ("HDPE"). HDPE offers toughness, low cost, moisture resistance, abrasion resistance, chemical resistance and high impact strength. It can be injection molded and colored, as desired. The tool set of the present invention is sufficiently durable to withstand the abusive conditions experienced during use in the garden, for example, as well as repeated exposure to harsh or inclement weather conditions.

Referring now to FIGS. 1 and 3, the confronting and substantially flat mating surfaces 18 and 19 are provided with magnetic material preferably adjacent respective interior distal ends 34 and 36. The magnetic material may be embedded in cooperating mating surfaces of the grip material and may, but need not, be in the form of a plurality of individual permanent magnet inserts, such as the magnets 37 and 38 shown in FIGS. 8–10, and described in more detail below.

In one use of the composite tool set, the magnetic material consists of a plurality of magnetic poles on each of the opposed surfaces 18 and 19. The polarity of the magnetic poles located on one of the opposed surfaces 18 and 19 is the same as the polarity of the magnetic poles on the other surface. Thus, as the mating surfaces of the handle grips of the tool set are brought together, toward their mating condition, the opposed magnetic poles repel each other with a force inversely proportional to the distance between them. In the absence of pressure tending to close the handles together, the handles 16 and 17 are pushed apart by the magnetic biasing force and the tool set thereby adopts the open or cutting position of pruning shears, as shown in FIG. 1. This means that upon completing a cutting operation, when the handles have been squeezed together by the user and the user's grip is then relaxed, the repelling magnetic forces at the mating surfaces 18 and 19 will cause the handles to spring apart to open the shear for futher use.

In another use of the composite tool set, the magnetic poles on opposed surfaces 18 and 19 are of opposite polarity and therefore attractive. With this arrangement, the crossed members of the tool set can be biased to and held magnetically in their mating or closed position, as shown in FIG. 2, for certain uses or to facilitate its storage or transportation.

Figure 6:
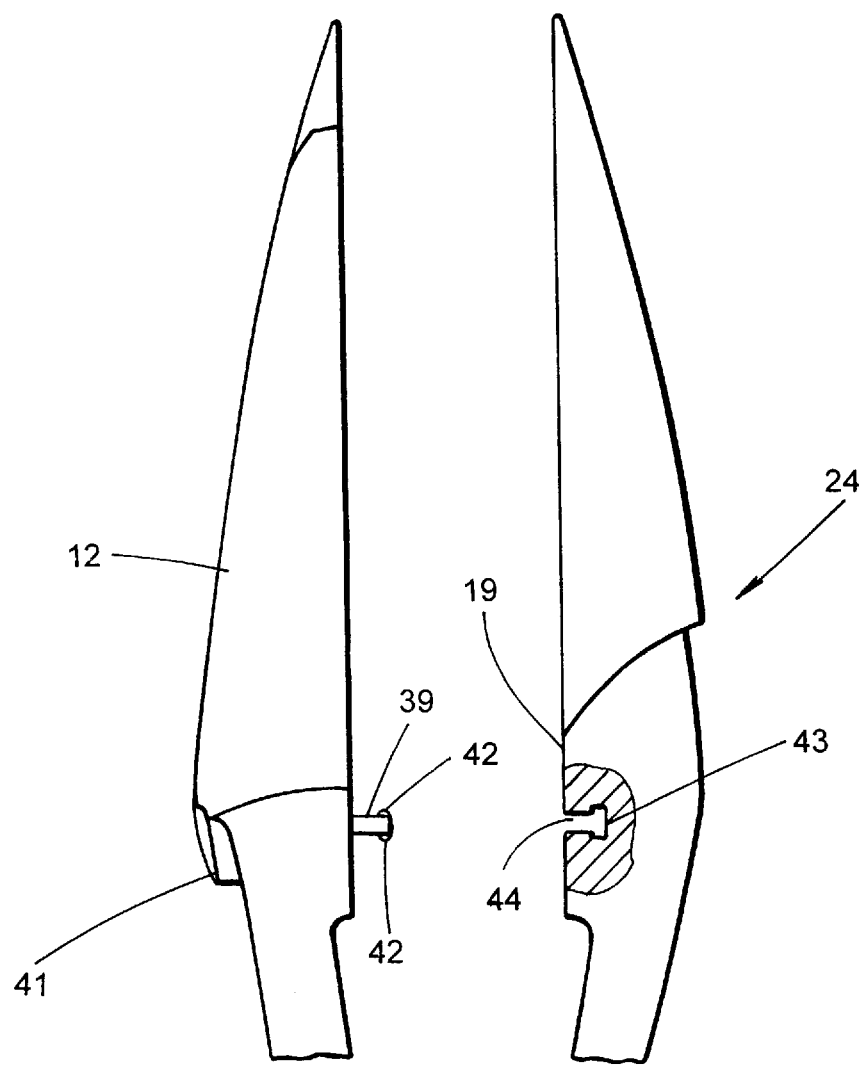
FIG. 6 is a partial cross sectional view of each of the tool members of the tool set of the present invention showing releasable latching elements.
Figure 7:
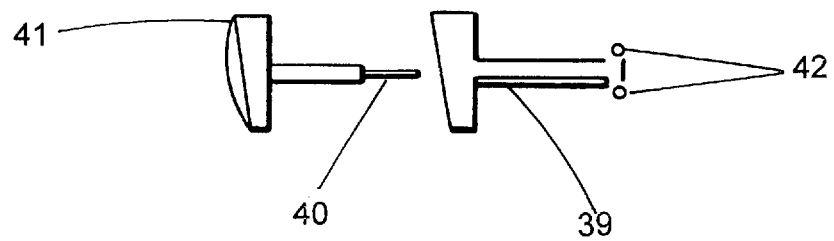
FIG. 7 is an exploded cross sectional view of a release button detent of the embodiment of FIG. 6.

The tool set has a detached condition in which the crossed tool members 12 and 13 defining the split body 11 are separated to permit their manipulating handles to be separately grasped by the user for independent uses, as desired. Referring to FIGS. 6 and 7, there is shown one embodiment of a latching mechanism for releasably holding the composite tool set together. In this embodiment, one of the tool members, for example the cultivator 12, may be provided with a laterally projecting detent pin 39 and cooperating button 41. The detent pin 39 projects outwardly from a portion of the first mating surface 18. The pin 39 is preferably of the single acting, positive locking, quick release type manufactured by Lockwell. It should be understood, however, that any suitable latching mechanism capable of being quickly and easily released may be used without departing from the scope of the present invention.

The detent pin 39 is provided at its distal end with at least a pair of diametrically opposed outwardly biased ball bearings 42. The ball bearings 42 are adapted to ride in a ball bearing race 43 formed at the inner end of a suitable recess 44 fashioned in a corresponding opposed portion of the second mating surface 19 on the shovel-type implement 24.

In operation, the tool elements 12 and 13 are held together when the detent pin 39 is fully inserted into the recess 44 such that the outwardly tensioned ball bearings ride and are retained within the race 43. To release the latch mechanism, the button 41 is depressed. Its actuating spring mechanism 40 acts within the detent pin 39 to override the outward tension on the ball bearings 42 so that the ball bearings are no longer capable of remaining within the ball bearing race 43. At this point, the detent pin 39 may be easily withdrawn from the recess and the tool members may be separated. Upon release of the button 41, the ball bearings 42 are again biased outwardly and the detent pin 39 may be inserted into the recess 44 and snapped into place to hold the tool members together in the assembled position. Where more tension strength is required to hold the tool members together, the detent pin 39 may have additional ball bearings, as desired.

Figure 8:
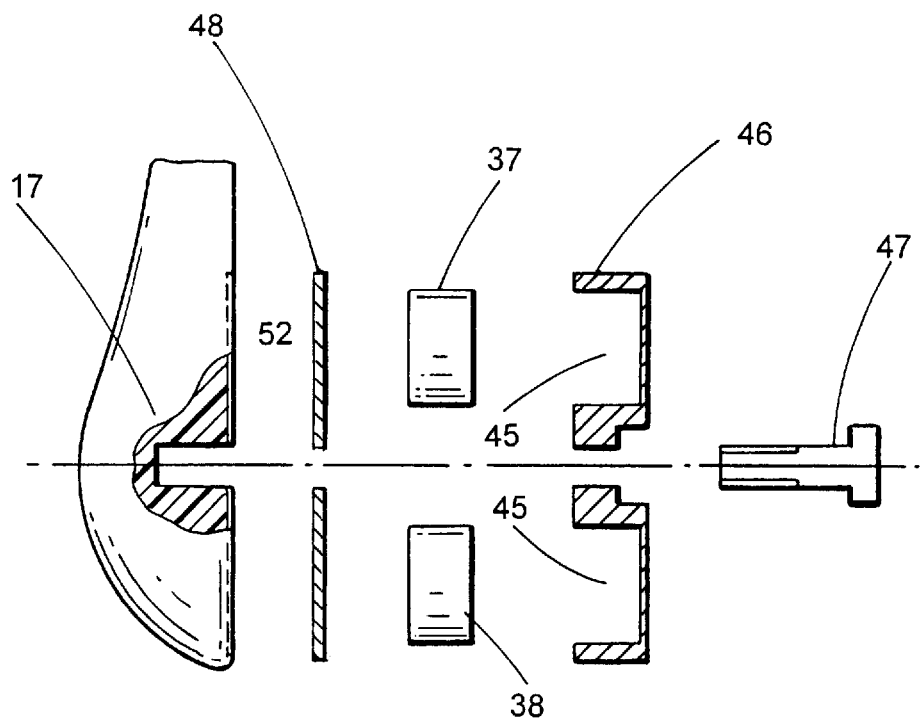
FIG. 8 is an exploded cross sectional view of a portion of a tool member handle together with a rotatable magnetic disc.
Figures 9, 10:
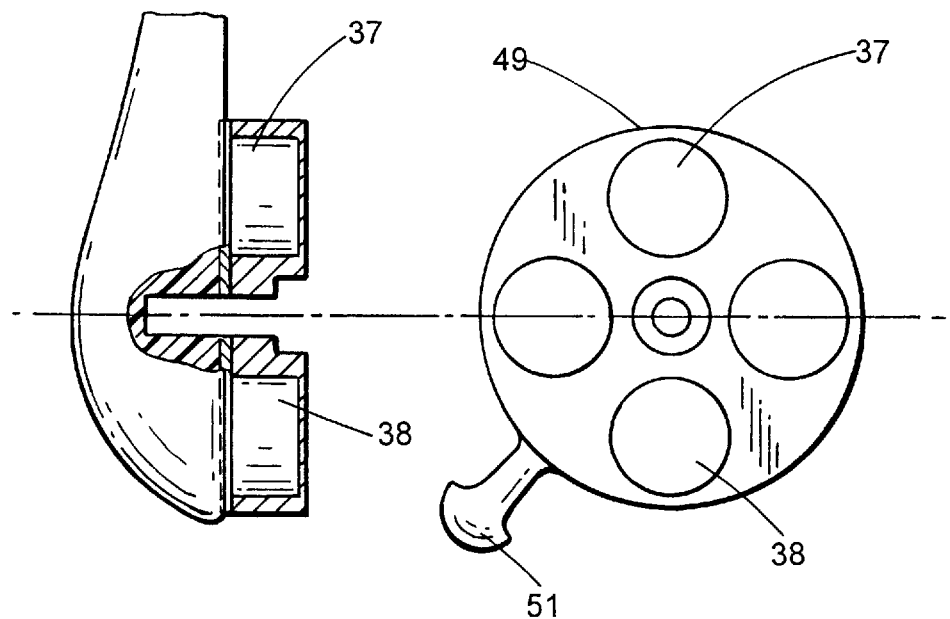
FIG. 9 is an elevated cross sectional view of the handle portion of FIG. 8 showing the magnetic disc in assembled position.
FIG. 10 is a top plan view of the rotatable magnetic disc of FIGS. 8 and 9.

Referring now to FIGS. 8–10, there is depicted one embodiment of a magnetic structure that may be utilized to bias the handle grips of the assembled composite tool set apart or to hold them together, as desired. In this embodiment, each of the magnets 37 and 38 is held within a corresponding pocket 45 defined by a suitable housing 46. The housing 46 is rotatably mounted by a retaining bolt 47 to a predetermined portion of the flat mating surface 18 or 19 of one of the tool members. In FIG. 8, the magnet housing is shown mounted to the handle of the shovel-type implement, by way of example only. In the structure depicted in FIG. 8, the magnets are held within the housing 46 by a retaining plate 48, but this may not be required, and is not intended to limit the scope of the present invention.

In the preferred embodiment, the housing 46 for the magnets is a circular disk 49, shown in FIGS. 1 and 10. The disc 49 has a short radially protruding handle element 51 which facilitates manual rotation of the disc. As seen best in FIG. 1, the disc 49 fits within a cylindrical recess 52 formed in the mating surface of the corresponding tool member grip in such a way that its outwardly facing surface area 53 (FIG. 3) is substantially flush with the surrounding surface area of the grip.

The disc 49 is shown in FIG. 10 with capacity to hold four magnets, however the selection of the number and the location of magnets, as well as their field strength, is a matter of design choice. Four such permanent magnets have been found appropriate in that they may be advantageously arranged in a matrix with one in each quadrant of the disc 49. Thus each of a pair of orthogonal diameters of the disc may contain an aligned corresponding pair of such magnets.

In one embodiment, the polarities of the outwardly facing magnetic poles the four magnets may alternate as between adjacent poles. Other advantageous matrices of pole polarities may be selected without departing from the scope of the present invention.

On the handle of the other tool member, a matrix of magnetic poles may be affixed in a similar position. Thus, in one relative relationship between respective pole matrices the tool handles are attracted to each other while in another relative relationship the handles are repelled from one another. As indicated, the disc 49 may be rotated back and forth to establish one such relationship or the other, as desired.

It will be understood that the invention is not to be limited by the use or specific location of discrete magnets or by the choice of a rotatable disc to hold and to rotate such magnets. Other similar mechanisms, mechanical or electrical, for inducing and alternating the polarity of interacting magnetic fields may be used without departing from the scope of the present invention. By way of example, electrical coils having switchable current flow therethrough to reverse magnetic polarity may be used where appropriate. The magnetic material used in the tool handles may be ferromagnetic and molded into any convenient form or shape such as cylindrical, annular or disc-like, as desired, without departing from the scope of the invention.

Moreover, all or part of the handle grip material itself may be molded from suitable magnetic material. In addition, the handle grips may be formed with magnetic material disposed in such a way that one or both of the handle grips, or portions thereof, may be pivoted or rotated with respect to the other magnetically to attract or repel the other, as desired. While the invention has been described in the context of one or more preferred embodiments, it will be understood by persons of ordinary skill in the relevant art that various modifications may be made without departing from the nature and scope of the present invention.

What is claimed is:

1. A tool set of a pivoted crossed lever type, comprising:
   first and second members pivotally and releasably connected to one another, each of said members having respectively opposed first and second surfaces adjacent the pivot axis therebetween;
   said first and second surfaces each having magnetic material in which respective first and second magnetic poles are induced, the polarity of at least one of said magnetic poles relative to the polarity of the other being switchable to enable said first and second surfaces to be selectively attracted or repelled from each other.

2. The device of claim 1 in which said first and second members have respective first and second handle portions and first and second tool portions.

3. The device of claim 2 in which said first and second surfaces are formed in said first and second handle portions respectively.

4. The device of claim 3 in which said magnetic material comprises a matrix of alternating magnetic poles in each of said first and second surfaces.

5. The device of claim 4 comprising means for positioning one of said matrices of alternating magnetic poles relative to the other whereby said matrices selectively attract or repel each other.

6. The device of claim 5 comprising means for switching the position of one of said matrices of alternating magnetic poles relative to the other.

7. The device of claim 6 in which said first tool portion comprises a cutting blade and said second tool portion comprises a shallow dished scoop.

8. A multi-purpose hand tool comprising:
   an upper tool element having a blade section;
   a shallow dished lower tool element of pointed configuration having an edge section, said upper and lower tool elements being pivotally interconnected so that said blade section engages and is slidable past said edge section when one of said tool elements is pivoted relative to the other; and
   a bias inducing element connected to at least one of said upper and lower tool elements and acting to cause at least one of said tool elements to pivot on said pivotal interconnection to a first position in which portions of said blade section and said edge section remote from said pivotal interconnection are in a spaced and opposing relationship, said bias inducing element being switchable to cause said upper and lower tool elements to pivot on said pivotal interconnection to a second position in which said blade and edge sections abut together.

9. The tool of claim 8 in which said upper tool element comprises a smoothly curved prong.

10. The tool of claim 9 in which the edge portion of said lower tool element comprises a cutting blade.

* * * * *